(12) United States Patent
Chang et al.

(10) Patent No.: US 6,728,041 B2
(45) Date of Patent: Apr. 27, 2004

(54) OPTICAL DEVICE

(75) Inventors: Sean Chang, Tao Yuan (TW); Hawk Chen, Taipei County (TW); Martin Chu, Hsinchu (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/200,878

(22) Filed: Jul. 22, 2002

(65) Prior Publication Data

US 2003/0184871 A1 Oct. 2, 2003

(30) Foreign Application Priority Data

Apr. 1, 2002 (TW) .................................. 91106562 A

(51) Int. Cl.[7] .............................................. G02B 27/14
(52) U.S. Cl. .............................. 359/634; 385/18; 385/24
(58) Field of Search ................................. 359/634, 627, 359/633; 385/18, 24, 47

(56) References Cited

U.S. PATENT DOCUMENTS 5,299,056 A * 3/1994 Kurata et al. ............ 359/341.1
6,545,814 B2 * 4/2003 Bartlett et al. ............ 359/636
2001/0038596 A1 * 11/2001 Xu et al. .................... 369/94
2001/0055439 A1 * 12/2001 Song .......................... 385/15
2002/0044721 A1 * 4/2002 Bjorklund ................. 385/18
2002/0131691 A1 * 9/2002 Garrett et al. ............. 385/24

* cited by examiner

Primary Examiner—Ricky Mack
Assistant Examiner—Brandi N Thomas
(74) Attorney, Agent, or Firm—Martine & Penilla, LLP

(57) ABSTRACT

An optical device includes a first input port, a first output port, a second output port, at least one filter, at least one reflector, a first reflection unit and a second reflection unit. The filter receives optical signals having wavelengths of $\lambda 1$ to $\lambda n$ from the first input port, selectively transmits the optical signal having a wavelength of $\lambda i$, and reflects other optical signals, wherein $1 \leq i \leq n$. The first reflection unit reflects the optical signal having the wavelength of $\lambda i$ back to the filter, so that the optical signal having the wavelength of $\lambda i$ can pass through the filter and can be output from the first output port. The reflector reflects the optical signals having the wavelengths of $\lambda 1$ to $\lambda n$ except for $\lambda i$ from the filter. The second reflection unit reflects the optical signals having the wavelengths of $\lambda 1$ to $\lambda n$ except for $\lambda i$ back to the reflector, so that after being reflected by the reflector and the filter, the optical signals having the wavelengths of $\lambda 1$ to $\lambda n$ except for $\lambda i$ are output from the second output port.

14 Claims, 9 Drawing Sheets

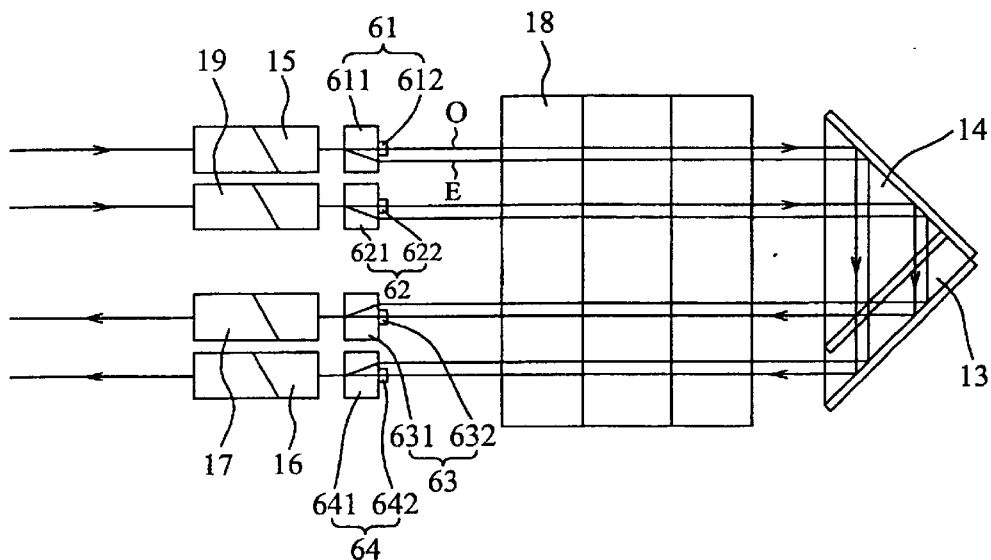
FIG. 6A
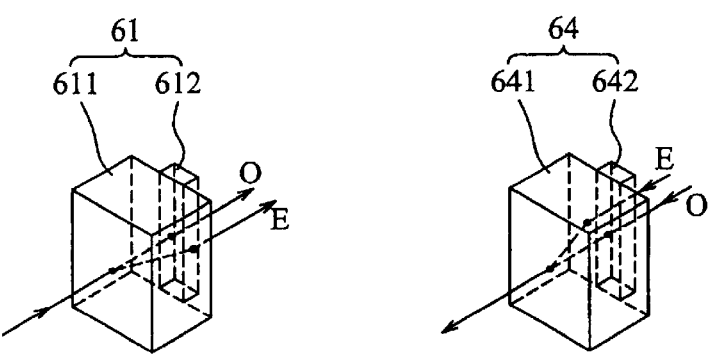
FIG. 6B
FIG. 6C

OPTICAL DEVICE

BACKGROUND OF THE INVENTION

1. Field of the Invention

The invention relates to an optical device and, in particular, to a tunable optical filter, and a tunable reconfigurable optical add/drop module (TROADM) using the tunable optical filter.

2. Description of the Related Art

The tunable optical filter is an optical device that is often used in an optical fiber system. The tunable optical filter receives multiwavelength optical signals and drops an optical signal having a specific wavelength from the multiwavelength optical signals. In the tunable optical filter, the specific wavelength that is to be dropped is tunable. Tuning a specific wavelength that is to be dropped, the tunable optical filter can drop signals of different channels from the multiwavelength optical signals.

The tunable reconfigurable optical add/drop module (TROADM) utilizes the architecture of the tunable optical filter to drop an optical signal having a specific wavelength from the multiwavelength optical signals. Except for receiving the multiwavelength optical signals, the TROADM further receives a desired optical signal having a specific wavelength, and adds the desired optical signal to the multiwavelength optical signals. Since the tunable optical filter is used, the specific wavelength that is to be added or dropped is tunable. In addition, when adding or dropping an optical signal having a certain specific wavelength, the transmission of other optical signals having other wavelengths is not influenced.

In the prior art, after receiving the multiwavelength optical signals, a TROADM first divides the received multiwavelength optical signals into a number of optical signals having specific wavelengths to travel on different waveguide elements, each of which is connected to a 2×2 optical switch that is used to switch the optical signal to be dropped. Such a TROADM has the following drawbacks. First, the structure of such TROADM is relatively complicated. Second, since a number of filters have to be used to drop an optical signal having a single wavelength, the cost of the TROADM is relatively high and it is difficult to assemble the TROADM.

Another conventional TROADM utilizes Bragg gratings to drop an optical signal having a specific wavelength. By switching between the Bragg gratings having different periods, the TROADM can tune the wavelength that is to be dropped or added. However, except for the need for optical switches, the TROADM still has to use an optical circulator to separate the optical signals input to the Bragg gratings and the optical signals reflected from the Bragg gratings. Using this method still cannot reduce the cost and the difficulties of assembly.

SUMMARY OF THE INVENTION

In view of the above-mentioned problems, the invention provides an optical device capable of solving the above-mentioned problems regarding the cost and the difficulties of assembly.

The optical device mainly includes a first input port, a first output port, a second output port, a filter, a reflector, a first reflection unit and a second reflection unit. The filter receives optical signals having wavelengths of $\lambda 1$ to $\lambda n$ from the first input port. The filter is rotatable to selectively transmit the optical signal having a wavelength of $\lambda i$, and to reflect other optical signals. The first reflection unit reflects the optical signal having the wavelength of $\lambda i$ back to the filter, so that the optical signal having the wavelength of $\lambda i$ can pass through the filter and be output from the first output port. The reflector reflects the optical signals having the wavelengths of $\lambda 1$ to $\lambda n$ except for $\lambda i$ from the filter. The second reflection unit reflects the optical signals having the wavelengths of $\lambda 1$ to $\lambda n$ except for $\lambda i$ back to the reflector, so that, the optical signals having the wavelengths of $\lambda 1$ to $\lambda n$ except for $\lambda i$ are output from the second output port after being reflected by the reflector and the filter.

The first input port, the first output port, the second output port, the first reflection unit and the second reflection unit are fixed in the optical device. The filter may be a filter film that is optically attached to or plated on a first optical plane of a flat glass, while the reflector may be a reflection film that is optically attached to or plated on a second optical plane of the flat glass. The flat glass is disposed between the first input port and the first reflection unit.

Both of the first reflection unit and the second reflection unit may be right triangular prisms each having two lateral surfaces provided with a reflection film, respectively, to reflect optical signals. Since the shapes of both of the first reflection unit and the second reflection unit are right triangles, the optical path through which the optical signal having the wavelength of $\lambda i$ enters the first reflection unit may be parallel to the optical path through which the optical signal having the wavelength of $\lambda i$ is reflected. In addition, the optical paths through which the optical signals having wavelength of $\lambda 1$ to $\lambda n$ except for $\lambda i$ enter the second reflection unit may be parallel to the optical paths through which the optical signals having wavelength of $\lambda 1$ to $\lambda n$ except for $\lambda i$ are reflected from the second reflection unit.

By properly designing the sizes of the first reflection unit and the second reflection unit, the distance between the optical path through which the optical signal having the wavelength of $\lambda i$ enters the first reflection unit and the optical path through which the optical having the wavelength of $\lambda i$ is reflected from the first reflection unit may be substantially equal to that between the first input port and the first output port. Similarly, the distance between the optical path through which the optical signals having the wavelength of $\lambda 1$ to $\lambda n$ except for $\lambda i$ enter the second reflection unit and the optical path through which the optical signals having the wavelength of $\lambda 1$ to $\lambda n$ except for $\lambda i$ are reflected from the second reflection unit may be substantially equal to that between the first input port and the second output port.

The optical device of the invention may further include a second input port for receiving a desired optical signal having a wavelength of $\lambda i$. The desired optical signal can be output therefrom after the desired optical signal passes through the filter and is reflected by the first reflection unit back to the filter.

The optical device of the invention may further include a mirror set, which includes a first mirror, a second mirror and a third mirror. When the mirror set is located between the input port and the reflection unit, the optical signals $\lambda 1$ to $\lambda n$ from the first input port are reflected to the second output port by the first mirror and the second mirror, while the desired optical signal from the second input port is reflected to the first output port by the first mirror and the third mirror.

Since the numbers of total elements and the movable elements in the optical device of the invention are decreased, the manufacturing cost and the difficulties of assembly can also be decreased.

BRIEF DESCRIPTION OF THE DRAWINGS

FIGS. 2A to 2C are schematic illustrations showing optical paths of various wavelength optical signals in the optical device in accordance with the first embodiment of the invention, wherein FIG. 2A shows the optical paths of optical signals $\lambda 1$ to $\lambda n$, FIG. 2B only shows the optical path of the optical signal $\lambda 1$, and FIG. 2C only shows the optical paths of the optical signals $\lambda 2$ to $\lambda n$.

FIGS. 6A to 6C are schematic illustrations showing an optical device in accordance with a fifth embodiment of the invention.

DETAILED DESCRIPTION OF THE PREFERRED EMBODIMENTS

The optical devices in accordance with preferred embodiments of the invention will be described with reference to the accompanying drawings, wherein the same reference numbers denote the same elements.

In the following description, the first embodiment discloses a tunable optical filter, the second embodiment discloses a tunable optical add/drop module (TOADM) implemented by the tunable optical filter, the third embodiment discloses a tunable reconfigurable optical add/drop module (TROADM) implemented by the tunable optical filter, and the fourth embodiment discloses a tunable multiwavelength optical filter which is implemented based on the first embodiment to filter various multiwavelength optical signals.

In the following embodiments, each of the optical devices includes an input port, an output port, at least one rotatable filter, and at least one reflection unit, wherein the input port, the output port and the reflection unit are fixed in a correlative manner within the optical devices. By adjusting the angle of the filter, the optical devices can tune the wavelength of the optical signal that is to be dropped from the multiwavelength optical signals.

First Embodiment: Tunable Optical Filter

Figure 1A:
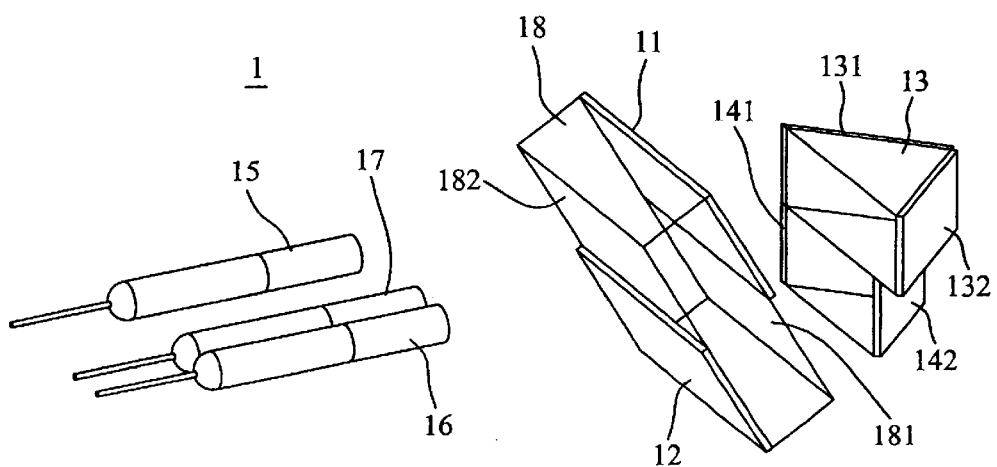
FIGS. 1A and 1B are schematic illustrations showing an optical device in accordance with a first embodiment of the invention.

Referring to FIG. 1, an optical device 1 in accordance with the first embodiment of the invention includes a first filter 11, a reflector 12, a first reflection unit 13, a second reflection unit 14, a first input port 15, a first output port 16, a second output port 17, and a flat glass 18.

The flat glass 18 is disposed between the first and second reflection units 13, 14 and the first input port 15, the first and second output ports 16, 17. Also, the flat glass 18 includes a first optical plane 181 and a second optical plane 182. The first filter 11 is a filter film optically attached to or plated on the first optical plane 181, and the reflector 12 is a reflection film optically attached to or plated on the second optical plane 182.

Both of the first reflection unit 13 and the second reflection unit 14 are right triangular prisms respectively having two total-reflection lateral surfaces. The first reflection unit 13 is located above the second reflection unit 14. In the embodiment, the two lateral surfaces of the first reflection unit 13 are provided with the reflection films 131 and 132, respectively, and the two lateral surfaces of the second reflection unit 14 are provided with the reflection films 141 and 142.

Figure 1B:
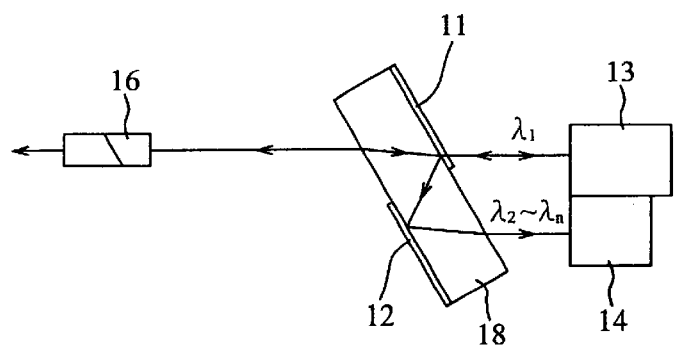

Referring FIG. 1B, multiwavelength optical signals having wavelengths of $\lambda 1$ to $\lambda n$ (hereinafter referred to as the optical signals $\lambda 1$ to $\lambda n$) received by the first input port 15 are incident on the second optical plane 182 of the flat glass 18, and are refracted in the glass plate. After being refracted, the optical signals are incident on the first filter 11 that is optically attached to or plated on the first optical plane 181 of the flat glass 18. The first filter 11 transmits an optical signal having a specific wavelength of $\lambda 1$ (hereinafter referred to as the optical signal $\lambda 1$), and reflects other optical signals having other wavelengths of $\lambda 2$ to $\lambda n$ (hereinafter referred to as the optical signals $\lambda 2$ to $\lambda n$) to the reflector 12. After being reflected from the reflector 12, the optical signals $\lambda 2$ to $\lambda n$ travel out of the first optical plane 181 of the flat glass 18, and then are incident on the second reflection unit 14.

Figure 2A:
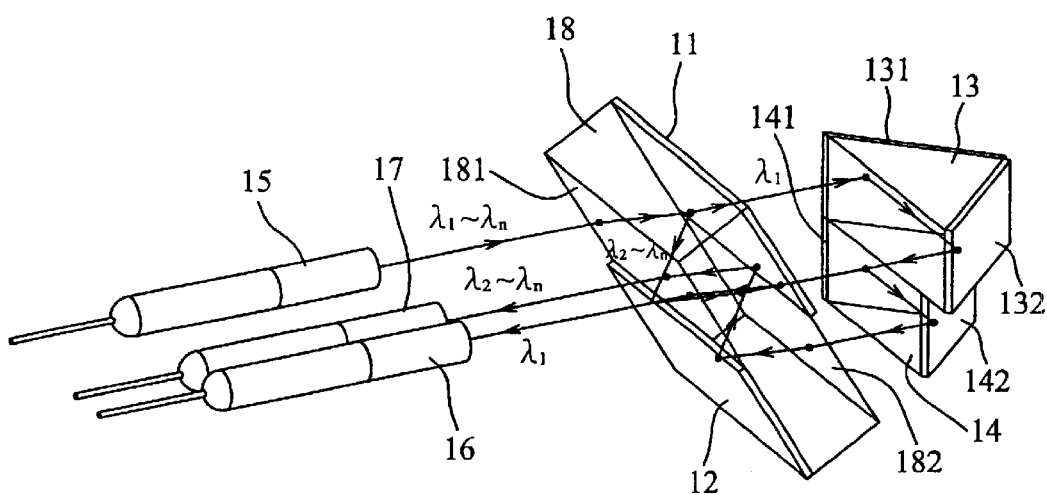

The optical paths of the optical signal will be described in detail with reference to FIGS. 2A to 2C. For the sake of clear description of the optical paths for the optical signals having different wavelengths, FIG. 2A shows the optical paths of the optical signals $\lambda 1$ to $\lambda n$, FIG. 2B only shows the optical path of the optical signal $\lambda 1$, and FIG. 2C only shows the optical paths of the optical signals $\lambda 2$ to $\lambda n$. It should be noted that the optical path of the optical signal $\lambda 1$ and the optical paths of the optical signals $\lambda 2$ to $\lambda n$ are the same before the optical signals are transmitted from the first input port 15 to the first filter 11.

Figure 2B:
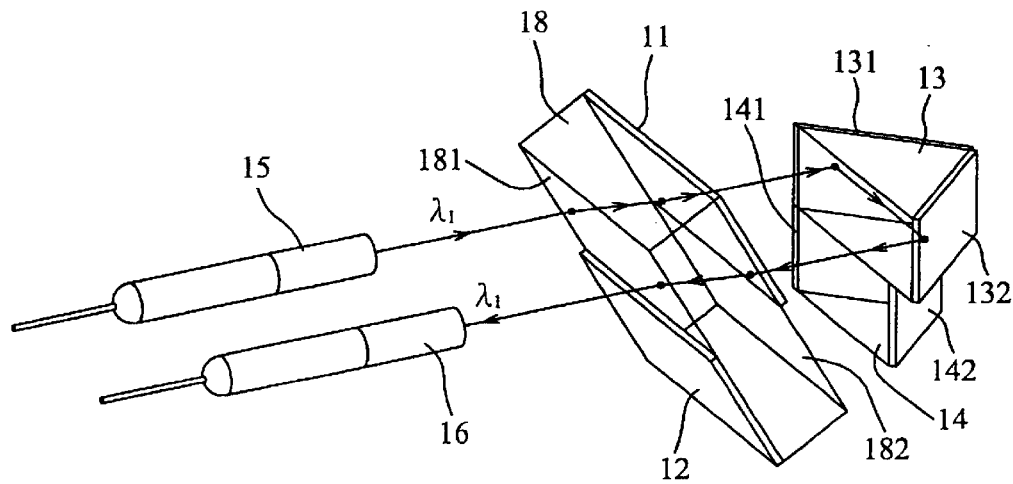

Referring to FIGS. 2A and 2B, after the optical signals are transmitted from the first input port 15 to the first optical plane 181 of the flat glass 18, the optical signal $\lambda 1$ is slightly deflected downward to be incident on the first filter 11. The first filter 11 transmits the optical signal $\lambda 1$ to be incident on the first reflection unit 13. Then, the optical signal $\lambda 1$ is reflected by the reflection films 131 and 132 back to the first filter 11, passes through the first filter 11 again, and enters the flat glass 18.

Since the first reflection unit 13 is a right triangular prism, the optical path through which the optical signal $\lambda 1$ is incident on the first reflection unit 13 is parallel to the optical path through which the optical signal $\lambda 1$ is reflected from the first reflection unit 13. Furthermore, the distance between the two parallel optical paths substantially equals the distance between the first input port 15 and the first output port 16. Thus, after being reflected from the first reflection unit 13 and passing through the first filter 11 and the flat glass 18, the optical signal $\lambda 1$ is output from the first output port 16.

Figure 2C:
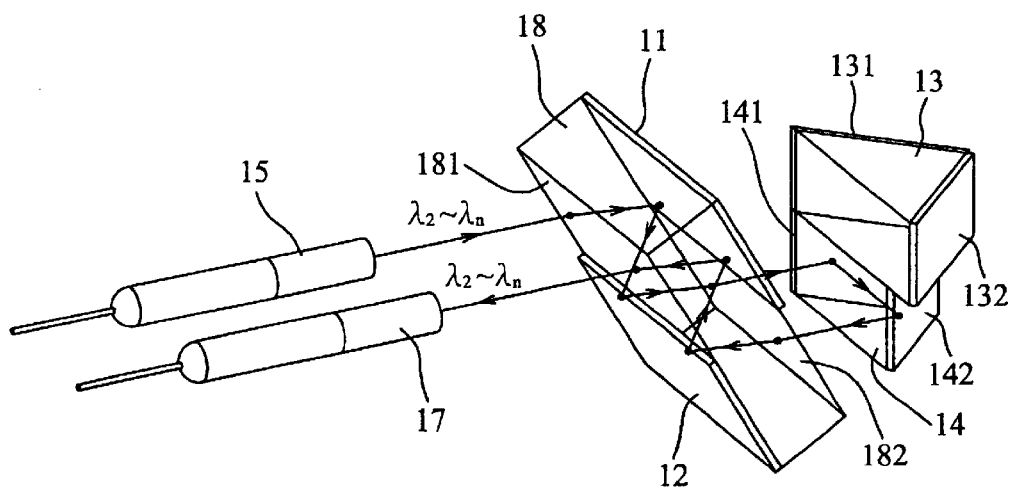

Referring to FIGS. 2A and 2C, after entering the first optical plane 181 of the flat glass 18 from the first input port 15, the optical signals $\lambda 2$ to $\lambda n$ are slightly deflected downward to be incident on the first filter 11. The first filter 11 reflects the optical signals $\lambda 2$ to $\lambda n$ to the reflector 12 to be emitted from the flat glass 18. Then, the optical signals $\lambda 2$ to $\lambda n$ are incident on the second reflection unit 14 and then reflected by the reflection films 141 and 142 back to the flat glass 18.

Since the second reflection unit 14 is a right triangular prism, the optical path through which the optical signals $\lambda 2$ to $\lambda n$ is incident on the second reflection unit 14 is parallel to the optical path through which the optical signals λ2 to λn are reflected from the second reflection unit 14. Furthermore, the distance between the two parallel optical paths is substantially equal to that between the first input port 15 and the second output port 17. In this embodiment, it should be noted that the size of the second reflection unit 14 is smaller than that of the first reflection unit 13 because the distance between the first input port 15 and the second output port 17 is shorter than that between the first input port 15 and the first output port 16. In other words, the sizes of the reflection units have to match the distances between the input port and the output ports.

After being reflected from the second reflection unit 14 and then entering the flat glass 18, the optical signals λ2 to λn are reflected by the reflector 12 back to the first filter 11, and then reflected by the first filter 11. Then, the optical signals λ2 to λn are emitted from the optical plane 181. Since the shift of the optical path of each of the optical signals λ2 to λn is equivalent to the distance between the first input port 15 and the second output port 17 after the optical signals λ2 to λn are reflected by the second reflection unit 14, the optical signals λ2 to λn emitted from the optical plane 181 are output from the second output port 17.

In this embodiment, the angle of the flat glass 18 can be adjusted. With the adjustment of the angle of the flat glass 18, the angle for the optical signals λ1 to λn incident on the first filter 11 changes, thereby changing the wavelengths of the optical signals capable of passing through the first filter 11. Thus, the first filter 11 can filter the optical signals having different wavelengths by adjusting the angle of the flat glass 18. In other words, the optical device 1 disclosed in the embodiment is able to tune the wavelength of the signal to be dropped by adjusting the angle of the flat glass 18. Thus, the optical device 1 is a tunable optical filter.

Second Embodiment: TOADM

Figure 3A:
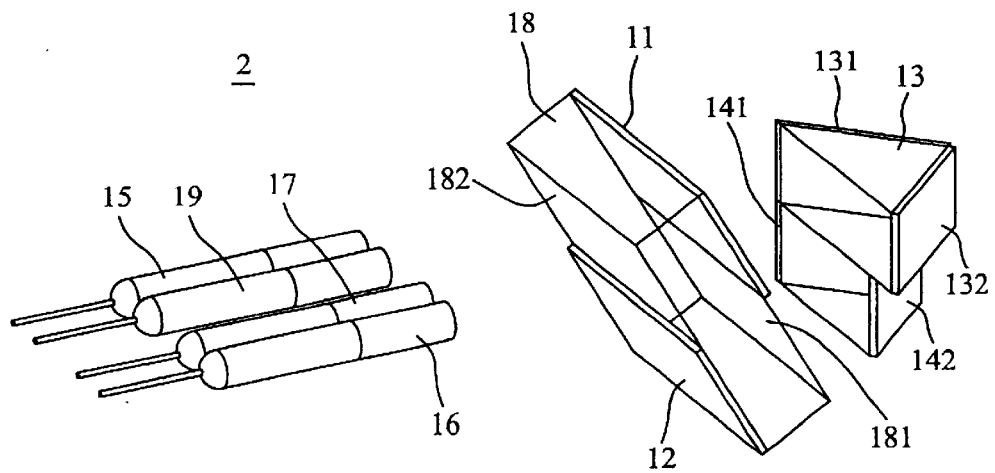
FIGS. 3A and 3B are schematic illustrations showing an optical device in accordance with a second embodiment of the invention.
Figure 3B:
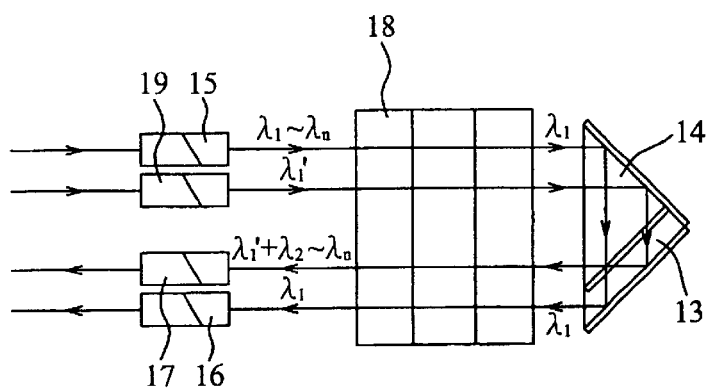

Referring to FIGS. 3A and 3B and compared to the first embodiment, an optical device 2 in accordance with the second embodiment of the invention further includes a second input port 19 for receiving an optical signal having a wavelength that is the same as the wavelength of the optical signal to be dropped from the optical signals λ1 to λn. That is, the second input port 19 receives a desired optical signal having the specific wavelength of λ1 (hereinafter referred to as the desired optical signal λ1'). Other elements are the same as those of the first embodiment.

After the desired optical signal λ1' received by the second input port 19 enters the flat glass 18, it passes through the first filter 11 to be incident on the first reflection unit 13. After being reflected by the reflection films 131 and 132, the desired optical signal λ1' passes through the first filter 11 and the flat glass 18 again to be output from the second output port 17. The optical path through which the optical signal λ1' is incident on the first reflection unit 13 is parallel to the optical path through which the optical signal λ1' is reflected from the first reflection unit 13. Also, the distance between the two parallel optical paths is substantially equal to that between the second input port 19 and the second output port 17.

As described in the foregoing first embodiment, the optical signal λ1 is output from the first output port 16 and the optical signals λ2 to λn are output from the second output port 17 after the optical signals λ1 to λn received by the first input port 15 are filtered by the first filter 11 and reflected by the reflector 12, the first reflection unit 13 and the second reflection unit 14. As a result, the optical signals λ1' and λ2 to λn can be output from the second output port in the second embodiment. In other words, the optical device 2 can drop the optical signal λ1 from the optical signals λ1 to λn, and add the desired optical signal λ1' to the optical signals λ2 to λn.

As described in the foregoing first embodiment, since the angle of flat glass 18 can be adjusted, when the wavelengths of the optical signals input from the second input port 19 change, the optical device 2 can changes the wavelengths of the dropped optical signal by adjusting the angle of the flat glass 18. Thus, the optical device 2 is a tunable optical add/drop module (TOADM).

Third Embodiment: TROADM

Figure 4A:
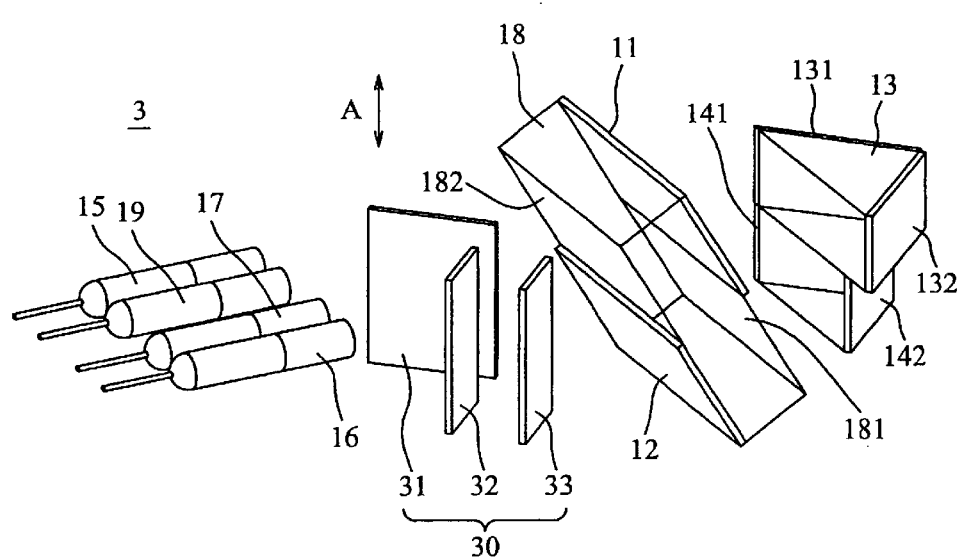
FIGS. 4A and 4B are schematic illustrations showing an optical device in accordance with a third embodiment of the invention.
Figure 4B:
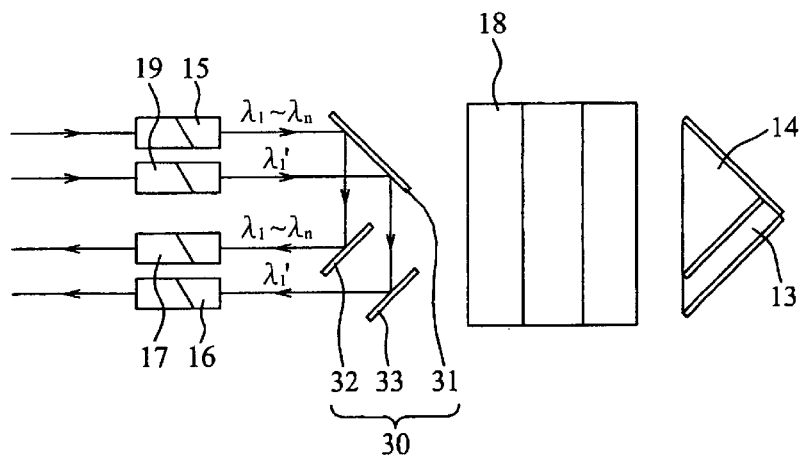

Referring to FIGS. 4A and 4B and compared to the above-mentioned second embodiment, an optical device 3 in accordance with the third embodiment of the invention further includes a mirror set 30. The mirror set 30 includes a first mirror 31, a second mirror 32 and a third mirror 33. Other elements are the same as those of the second embodiment.

The mirror set 30 may be moved into and away from the specific position between the input and output ports and the glass plate 18 as shown in FIG. 4A. When the mirror set 30 is moved away, the optical path of the optical signals λ1 to λn from the first input port 15 and the optical path of the desired optical signal λ1' from the second input port 19 are not influenced. Therefore, the optical paths of the optical signals λ1 to λn and the desired optical signal λ1' are the same as those as described in the second embodiment. The first output port 16 outputs the optical signal λ1 dropped from the optical signals λ1 to λn, while the second output port 17 outputs the desired optical signal λ1' and the optical signals λ2 to λn.

When the mirror set 30 is moved between the input and output port and the flat glass 18, the optical signals λ1 to λn from the first input port 15 are reflected from the first mirror 31 and the second mirror 32 to the second output port 17. Also, the desired optical signal λ1' from the second input port 19 is reflected from the first mirror 31 and the third mirror 33 to the first output port 16 but not to the flat glass 18. In other words, the first output port 16 outputs the desired optical signal λ1' from the second input port 19, while the second output port 17 outputs the optical signals λ1 to λn from the first input port 15.

As can be easily understood from the above description, except for changing the wavelengths of the to-be-dropped optical signals by adjusting the angle of the flat glass 18, the optical device 3 further can choose whether or not to drop or add optical signals by adjusting the positions of the mirrors 30. Thus, the optical device 3 is a tunable reconfigurable optical add/drop module (TROADM).

Fourth Embodiment: Tunable Optical Multi-Wavelength Filter

Figure 5A:
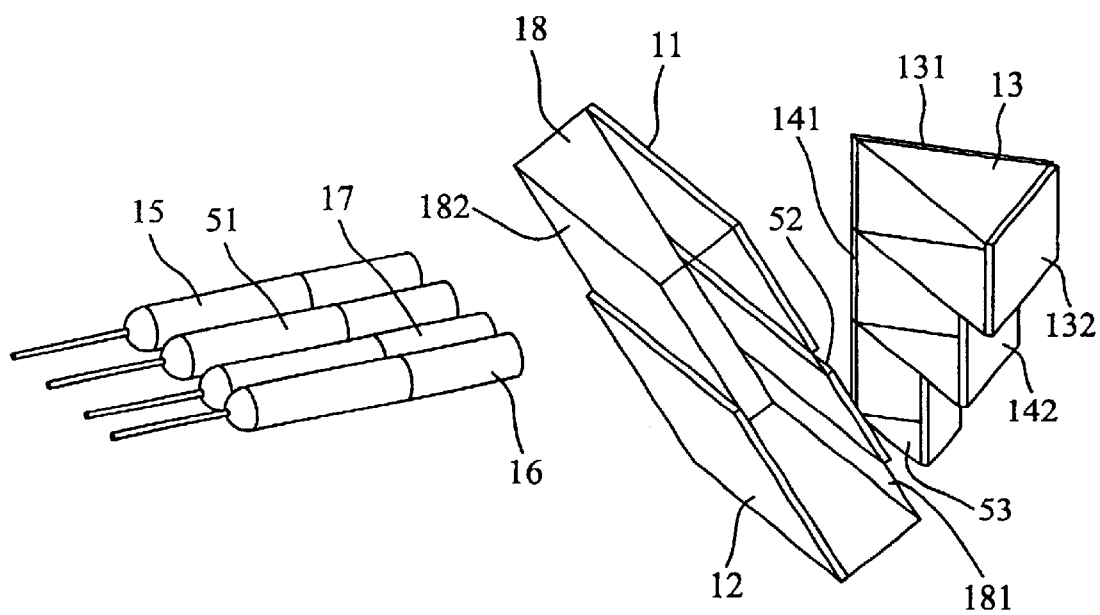
FIGS. 5A to 5C are schematic illustrations showing an optical device in accordance with a fourth embodiment of the invention.
Figure 5B:
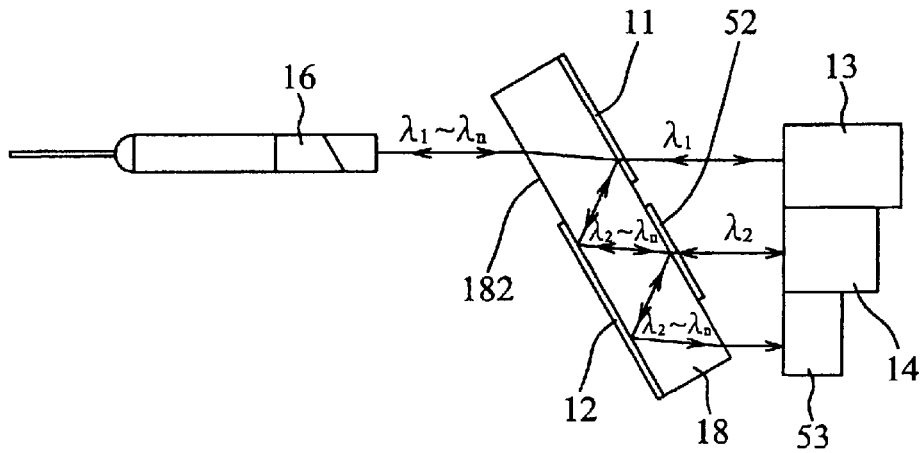
Figure 5C:
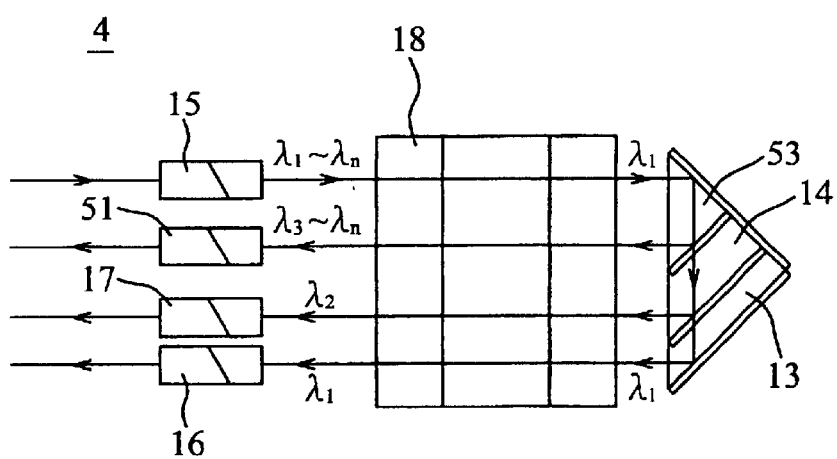

Referring to FIGS. 5A to 5C and compared to the above-mentioned first embodiment, an optical device 4 in accordance with the fourth embodiment of the invention further includes a third output port 51, a second filter 52 and a fourth reflection unit 53. Other elements are the same as those of the first embodiment.

In the fourth embodiment, the second filter 52 is optically attached to or plated on the second optical plane 182 of the flat glass 18, and the wavelengths of the optical signals passing through the second filter 52 are different from those passing through the first filter 11. In addition, similar to the first filter 11, the wavelengths of the optical signals passing through the second filter 52 relates to the incident angles of the optical signals. Thus, by adjusting the angle of the flat glass 18, the second filter 52 also can transmit optical signals having different wavelengths.

As shown in FIGS. 5B and 5C, this embodiment is similar to the first embodiment. The optical signals λ1 to λn received by the first input port 15 enter the second optical plane 182 of the flat glass 18 and are refracted. After being refracted, the optical signals enter the first filter 11 that is optically attached to or plated on the first optical plane 181 of the flat glass 18. The first filter 11 transmits the optical signal λ1, and reflects the optical signals λ2 to λn to the reflector 12.

In the fourth embodiment, the optical signals λ2 to λn are then reflected from the reflector 12 to the second filter 52. The second filter 52 transmits the optical signal λ2, and reflects the optical signals λ3 to λn to the reflector 12 again. The optical signal λ2 passing through the second filter 52 is incident on the second reflection unit 14. On the other hand, the optical signals λ3 to λn are reflected again by the reflector 12 to be emitted from the flat glass 18 and then incident on the fourth reflection unit 53.

Since the second reflection unit 14 is a right triangular prism, the optical path through which the optical signal λ2 is incident on the second reflection unit 14 is parallel to the optical path through which the optical signal λ2 is reflected by the second reflection unit 14. Furthermore, the distance between the two parallel optical paths is substantially equal to that between the first input port 15 and the second output port 17. Similarly, since the fourth reflection unit 53 is also a right triangular prism, the optical path through which the optical signals λ3 to λn are incident on the fourth reflection unit 53 is parallel to the optical path through which the optical signals λ3 to λn are reflected from the fourth reflection unit 53. Moreover, the distance between the two parallel optical paths is substantially equal to that between the first input port 15 and the third output port 51. In this embodiment, it should be noted that since the distance between the first input port 15 and the third output port 51 is smaller than that between the first input port 15 and the first output port 16 as well as that between the first input port 15 and the second output port 17, the size of the fourth reflection unit 53 is smaller than that of the first reflection unit 13 as well as that of the second reflection unit 14. FIG. 5C shows the relationship between the sizes of the reflection unit and the distances between the input ports and the output ports.

The optical signal λ2 that is reflected back from second reflection unit 14 enters the flat glass 18 and passes through the second filter 52. Next, the optical signal λ2 is reflected by the reflector 12 to the first filter 11, and then reflected by the first filter 11 back to the second output port 17. On the other hand, the optical signals λ3 to λn that are reflected back by the fourth reflection unit 53 enter the flat glass 18, and are then reflected by the reflector 12, the second filter 52, the reflector 12 and the first filter 11 sequentially. Then, the optical signals λ3 to λn may be output from the third output port 51.

Fifth Embodiment

Referring to FIG. 6A, the operation principle and elements in this embodiment are substantially the same as those in the second embodiment except for the following difference. The difference resides in that polarization converters 61, 62, 63 and 64 are provided and disposed between each of the input and output ports and the flat glass 18 in the fifth embodiment of the invention, respectively. Each of the polarization converters is composed of a birefrigent crystal 611, 621, 631, or 641 and a half-wave plate 612, 622, 632, or 642.

Referring to FIG. 6B and taking the polarization converter 61 as an example, when the optical signals from the collimator 15 enter the polarization converter 61, the optical signals are divided into two polarization rays P and S by the birefrigent crystal 611, wherein the S-polarization ray will directly pass through the birefrigent crystal 611 (that is, ordinary ray (O ray)) and the P-polarization ray will be deflected (that is, extraordinary ray (E ray)). Then, the S-polarization ray passes through the half-wave plate 612 to be rotated by 90 degrees to become a P-polarization ray. Accordingly, after passing through the polarization converter 61, the polarization directions of the optical signals are the same, thereby decreasing the chromatic dispersion problem in the polarized mode.

As shown in FIG. 6C, when the optical signals enter the polarization converter 64 from the half-wave plate 612 through the total reflection of the reflection unit 13 (e.g. a prism), the half-wave plate 642 rotates the polarization direction of one of the two rays having the same polarization direction, so that the polarization directions of the two rays differ from each other by 90 degrees. After passing through the birefrigent crystal 641, the two rays merge and the optical paths of the two rays from the input port to the output port are the same such that the chromatic dispersion in the polarized mode can be eliminated.

Sixth Embodiment

Figure 7:
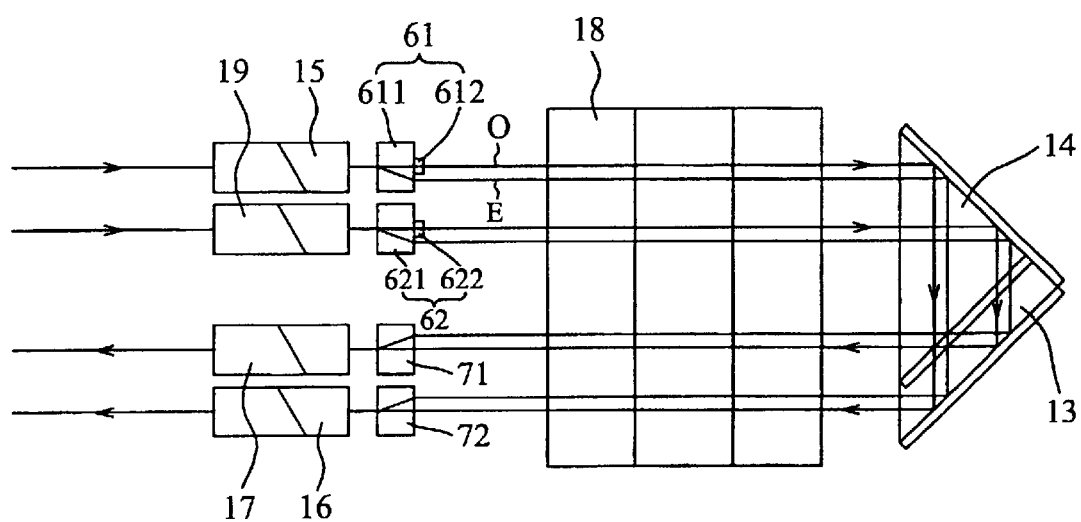
FIG. 7 is a schematic illustration showing an optical device in accordance with a sixth embodiment of the invention.

Referring to FIG. 7, the operation principle and elements in this embodiment are substantially the same as those in the fifth embodiment except for the following difference. The difference is in that the two polarization converters at the output port are replaced by two GRIN lenses 71 and 72 having larger diameters. After the optical signals pass through the polarization converter to be divided into two rays, these two rays can be received by the GRIN lenses 71 and 72 and are merged. As for the compensation for the optical path difference, it may be accomplished by adjusting the thickness of the half-wave plate. Thus, the optical paths of the two rays from the input to the output may be adjusted to be the same so as to eliminate the chromatic dispersion in the polarized mode.

While the invention has been described by way of examples and in terms of preferred embodiments regarding the tunable optical filter, and the TOADM and the TROADM both implemented by the tunable optical filter, it is to be understood that the invention is not limited to the disclosed embodiments. To the contrary, it is intended to cover various modifications.

For instance, the sizes of the reflection unit, the positional arrangements of the input ports and the output ports, and the wavelengths of optical signals that can pass through or reflected by the filters may also be changed with respect to the actual condition.

In addition, although the first filter transmits the optical signal λ1 and reflects the optical signals λ2 to λn in the first embodiment, the first filter may also be designed to reflect the optical signal λ1 and transmit the optical signals λ2 to λn.

Furthermore, in the fourth embodiment, there may be more than three filters for filtering more than three optical signals having different wavelengths. In other words, arranging the positions of the input ports, the output ports and the reflection units properly, the tunable multiwavelength optical filter of the invention may separate M separated optical signals from the optical signals having wavelengths of λ1 to λn using M filters, and output the separated optical signals from K output ports, wherein $1 \leq M \leq K \leq n$. At this time, M reflection units may be provided to reflect the separated optical signals passing through the filters as well as the reflected optical signals from the filters back to the filters.

Therefore, the scope of the appended claims should be accorded the broadest interpretation so as to encompass all such modifications.

What is claimed is:

1. An optical device comprising:
   a first input port for receiving multiwavelength optical signals;
   a first output port;
   a second output port;
   a filter for receiving the multiwavelength optical signals from the first input port, and selectively transmitting an optical signal having a specific wavelength;
   a first reflection unit for reflecting the optical signal having the specific wavelength back to the filter, so that the optical signal having the specific wavelength passes through the filter to be output from the first output port;
   a reflector for reflecting the multiwavelength optical signal from the filter except for the optical signal having the specific wavelength; and
   a second reflection unit for reflecting the multiwavelength optical signals except for the optical signal having the specific wavelength back to the reflector, so that the multiwavelength optical signals except for the optical signal having the specific wavelength are output from the second output port after being reflected by the reflector and the filter.

2. The optical device according to claim 1, further comprising:
   a flat glass including a first optical plane and a second optical plane, and disposed between the first input port and the first reflection unit, the filter being a filter film optically attached to or plated on the first optical plane, and the reflector being a reflection film optically attached to or plated on the second optical plane.

3. The optical device according to claim 1, wherein the first input port, the first output port, the second output port, the first reflection unit and the second reflection unit are fixed in the optical device, and the filter is movable.

4. The optical device according to claim 1, wherein the first reflection unit is a right triangular prism having two lateral surfaces provided with reflection films to reflect the optical signal having the specific wavelength, the optical path through which the optical signal having the specific wavelength enters the first reflection unit is parallel to the optical path through which the optical signal is reflected from the first reflection unit, and the distance between the two parallel optical paths substantially equals the distance between the first input port and the first output port.

5. The optical device according to claim 1, wherein the second reflection unit is a right triangular prism having two lateral surfaces provided with reflection films to reflect the multiwavelength optical signals except for the optical signal having the specific wavelength, the optical path through which the multiwavelength optical signals except for the optical signal having the specific wavelength enter the second reflection unit is parallel to the optical path through which the multiwavelength optical signals are reflected from the second reflection unit, and the distance between the two parallel optical paths substantially equals the distance between the first input port and the second output port.

6. The optical device according to claim 1, further comprising:
   a second input port for receiving a desired optical signal having a specific wavelength, wherein the desired optical signal is output therefrom after to pass through the filter and be reflected by the first reflection unit back to the filter and output from the second output port, wherein the optical path through which the desired optical signal enters the first reflection unit is parallel to the optical path through which the desired optical signal is reflected from the first reflection unit, and the distance between the two parallel optical paths is substantially equal to that between the second input port and the second output port.

7. The optical device according to claim 6, further comprising:
   a mirror set including a first mirror, a second mirror and a third mirror, wherein the multiwavelength optical signals from the first input port are reflected from the first mirror and the second mirror to the second output port, and the desired optical signal from the second input port is reflected from the first mirror and the third mirror to the first output port when the mirror set is disposed between the first input port and the filter.

8. The optical device according to claim 1, wherein the first input port, the first output port and the second output port are provided with a polarization converter, respectively.

9. The optical device according to claim 8, wherein each of the polarization converters comprises:
   a birefrigent crystal for dividing the multiwavelength optical signals into an ordinary ray and an extraordinary ray; and
   a half-wave plate for rotating one of the polarization directions of the ordinary ray and the extraordinary ray by substantially 90 degrees.

10. The optical device according to claim 1, wherein:
    the first input port is provided with a polarization converter for dividing the multiwavelength optical signals into an ordinary ray and an extraordinary ray; and
    the first output port and the second output port are provided with a GRIN lens, respectively, for merging the ordinary ray with the extraordinary ray at the first output port and the second output port, respectively.

11. The optical device according to claim 10, wherein the polarization converter comprises:
    a birefrigent crystal for dividing the multiwavelength optical signals into the ordinary ray and the extraordinary ray; and
    a half-wave plate for rotating a polarization direction of one of the ordinary ray and the extraordinary ray.

12. An optical device, comprising:
    a first input port for receiving optical signals having wavelengths of $\lambda 1$ to $\lambda n$;
    a second input port for receiving a desired optical signal having a wavelength of $\lambda i$, wherein $1 \leq i \leq n$;
    a first output port;
    a second output port;
    a filter for receiving the optical signals having wavelengths of $\lambda 1$ to $\lambda n$ from the first input port, the filter being able to selectively transmit the optical signal having a wavelength of $\lambda i$ and the desired optical signal;
    a first reflection unit for reflecting the optical signal having a wavelength of $\lambda i$ and the desired optical signal so that the optical signal having a wavelength of $\lambda i$ passes through the filter and output from the first output port and the desired optical signal passes through the filter and output from the second output port;
    a reflector for reflecting the optical signals having wavelengths of $\lambda 1$ to $\lambda n$ except for $\lambda i$; and
    a second reflection unit for reflecting the optical signals having wavelengths of $\lambda 1$ to $\lambda n$ except for $\lambda i$ back to the reflector so that the optical signals having wavelengths of λ1 to λn except for λi are output from the second output port after passing through the reflector and being reflected by the filter.

13. An optical device comprising:
an input port for receiving optical signals having wavelengths of λ1 to λn;
K output ports, wherein $1 \leq K \leq n$;
at least one filter for selectively separating M optical signals from the optical signals having wavelengths of λ1 to λn, wherein the filters are rotatable for adjusting the wavelengths of the separated optical signals, wherein $1 \leq M \leq K$;
(M+1) reflection units for reflecting the separated optical signals passing through the filters and the other optical signals reflected by the filters back to the filters; and
at least one reflector for reflecting at least one of the separated optical signals, so that the separated optical signals are output from the output ports, respectively.

14. An optical device, comprising:
a first input port for receiving optical signals having wavelengths of λ1 to λn;
a first output port;
a second output port;
a filter for receiving the optical signals having wavelengths of λ1 to λn from the first input port, the filter being rotatable to selectively reflect the optical signal having a wavelength of λi, wherein $1 \leq i \leq n$;
a first reflection unit for reflecting the optical signals, which have the wavelengths of λ1 to λn except for λi and pass through the filter, back to the filter, so that the optical signals having the wavelengths of λ1 to λn except for λi pass through the filter and output from the first output port;
a reflector for reflecting the optical signal which has the wavelength of λi and is reflected by the filter; and
a second reflection unit for reflecting the optical signal, which has the wavelength of λi and is reflected by the reflector, back to the reflector, so that the optical signal having the wavelength of λi is output from the second output port after passing through the reflector and being reflected by the filter.

* * * * *